US 11,903,338 B2

(12) United States Patent
Verhoef et al.

(10) Patent No.: US 11,903,338 B2
(45) Date of Patent: Feb. 20, 2024

(54) SYSTEMS AND METHODS FOR RECIPROCATING A CUTTER OF AN AGRICULTURAL HARVESTING HEAD

(71) Applicant: DEERE & COMPANY, Moline, IL (US)

(72) Inventors: Todd M. Verhoef, Coal Valley, IL (US); Curt A. Elpers, Coal Valley, IL (US); Logan K. Trueblood, Port Byron, IL (US)

(73) Assignee: Moline, IL, Moline, IL (US)

( * ) Notice: Subject to any disclaimer, the term of this patent is extended or adjusted under 35 U.S.C. 154(b) by 120 days.

(21) Appl. No.: 17/446,752

(22) Filed: Sep. 2, 2021

(65) Prior Publication Data

US 2022/0256765 A1 Aug. 18, 2022

Related U.S. Application Data

(60) Provisional application No. 63/149,849, filed on Feb. 16, 2021.

(51) Int. Cl.
*A01D 34/38* (2006.01)
*A01D 34/04* (2006.01)
*A01D 34/14* (2006.01)
*A01D 34/32* (2006.01)

(52) U.S. Cl.
CPC .............. *A01D 34/38* (2013.01); *A01D 34/04* (2013.01); *A01D 34/145* (2013.01); *A01D 34/32* (2013.01)

(58) Field of Classification Search
CPC ...... A01D 34/38; A01D 34/04; A01D 34/145; A01D 34/32
See application file for complete search history.

(56) References Cited

U.S. PATENT DOCUMENTS

| 191,675 | A | * | 6/1877 | Haskin | A01D 34/831 56/290 |
| 2,313,670 | A | * | 3/1943 | Roberts | A01D 65/02 56/312 |
| 2,484,861 | A | * | 10/1949 | Stewart | A01D 34/38 74/25 |
| 2,514,861 | A | * | 7/1950 | Hackerott | A01D 34/831 56/291 |

(Continued)

FOREIGN PATENT DOCUMENTS

| DE | 2444173 A1 | 3/1976 |
| DE | 9411631 U1 | 9/1994 |

(Continued)

*Primary Examiner* — Thomas B Will
*Assistant Examiner* — Julia C Tran (57) ABSTRACT

Systems and method for linearly displacing an object, such as a cutter or other component, in response to a rotation of a pivotable arm are disclosed. The systems and method encompass one or more actuators, such as hydraulic cylinders, to pivot a pivotable arm pivotable about an axis. A flexible component coupled to an end of the pivotable arm is displaced in response to the rotational motion of the pivotable arm. Movement of the flexible component in response to rotation of the pivotable arm is converted into linear motion via curved surface on which the flexible component rides. The pivotable arm is rotated in response to actuation of one or more actuators, such as one or more hydraulic cylinders, coupled to the pivotable arm.

15 Claims, 5 Drawing Sheets

(56) References Cited

U.S. PATENT DOCUMENTS

| | | | | |
|---|---|---|---|---|
| 2,539,720 A * | 1/1951 | Bender | A01D 34/38 92/9 |
| 2,569,507 A * | 10/1951 | Von Schlegell | F15B 7/02 92/75 |
| 3,561,200 A * | 2/1971 | Minunno | A01D 34/02 56/17.6 |
| 3,570,637 A * | 3/1971 | Pitman | F16H 7/00 188/259 |
| 3,763,638 A * | 10/1973 | Vogelenzang | A01D 34/13 56/293 |
| 3,800,612 A * | 4/1974 | Fulghum | A01D 34/6812 474/135 |
| 4,048,791 A * | 9/1977 | Treen | A01D 34/84 56/246 |
| 4,815,265 A * | 3/1989 | Guinn | A01D 34/30 56/297 |
| 4,942,725 A * | 7/1990 | Ruder, Sr. | A01D 34/30 56/17.6 |
| 5,157,906 A * | 10/1992 | Abrahamson | A01D 34/30 56/17.6 |
| 5,377,480 A * | 1/1995 | Locher | A01D 34/13 56/246 |
| 5,787,786 A * | 8/1998 | Zeuner | F15B 15/149 91/171 |
| 6,557,332 B2 * | 5/2003 | Rhody | A01D 34/38 91/171 |
| 7,237,470 B2 * | 7/2007 | Burns, Sr. | F15B 15/202 417/397 |
| 7,520,118 B1 * | 4/2009 | Priepke | A01D 34/30 56/257 |
| 10,165,726 B2 * | 1/2019 | Lauwers | A01D 41/06 |
| 2004/0163373 A1 * | 8/2004 | Adams | A01D 34/78 56/10.2 R |
| 2008/0295478 A1 * | 12/2008 | Majkrzak | A01D 34/38 56/229 |
| 2014/0260153 A1 * | 9/2014 | Blank | A01D 34/831 56/14.7 |
| 2016/0174460 A1 * | 6/2016 | Honey | F16H 37/124 56/181 |
| 2020/0260641 A1 * | 8/2020 | Schmidt | A01D 34/18 |
| 2020/0375099 A1 * | 12/2020 | Andersen | A01D 34/13 56/293 |

FOREIGN PATENT DOCUMENTS

| | | |
|---|---|---|
| EP | 0478940 B1 | 6/1995 |
| EP | 2407020 B1 | 10/2014 |

* cited by examiner

SYSTEMS AND METHODS FOR RECIPROCATING A CUTTER OF AN AGRICULTURAL HARVESTING HEAD

CROSS REFERENCE TO RELATED APPLICATIONS

This application claims the benefit of U.S. Provisional Application No. 63/149,849, filed Feb. 16, 2021, the entire contents of which are incorporated herein by reference.

FIELD OF THE DISCLOSURE

The present disclosure relates generally to actuators and, particularly, to actuators for systems of an agricultural vehicle.

BACKGROUND OF THE DISCLOSURE

Agricultural vehicles, such as combine harvesters, utilize rotary actuators to generate linear motion. The rotary actuators, such as rotary hydraulic motors, are used to generate rotary motion. The rotary motion is converted into oscillating linear motion with the use of a rotary motion-to-linear motion converter, such as a wobble box. The oscillating movement is applied to the knives of an agricultural harvester head to linearly oscillate the knives. This oscillating motion generates a cutting action to sever crops from a field.

SUMMARY OF THE DISCLOSURE

A first aspect of the present disclosure is directed to a drive system. The drive system may include a pivotable arm pivotable about an axis disposed between a first end of the pivotable arm and a second end of the pivotable arm opposite the first end; an actuator coupled to a first end of the pivotable arm; a flexible component coupled to the second end of the pivotable arm; and a follower coupled to opposing ends of the flexible component. The pivotable arm may be pivotable about the axis in response to one of an extension or retraction of the actuator. The follower may be movable in a linear motion in response to the extension or the retraction of the actuator.

A second aspect of the present disclosure is directed to a method of generating linear motion from pivoting motion. The method may include pivoting a pivotable arm about an axis in a first direction of rotation in response to one of an extension or retraction of a hydraulic cylinder coupled to a first end of the pivotable arm; displacing a flexible component coupled to a second end of the pivotable arm to generate a pulling force at an end of the flexible component, opposite the first end, in response to pivoting of the pivotable arm by the hydraulic cylinder; and linearly displacing a follower coupled to opposing ends of the flexible component in response to the pulling force.

A third aspect of the present disclosure is directed to a method. The method may include alternately rotating a pivotable arm about an axis in a first rotational direction and a second rotational direction by alternately extension of an actuator and retraction of the actuator; converting the alternating rotational movement of the pivotable arm about the axis into a reciprocating linear movement; and reciprocating a follower in linear motion in response to the converted reciprocating rotational movement.

The various aspects may include one or more of the following features. A tensioner may engage with the flexible component to generate tension in the flexible component. The follower may include a blade. The blade may perform two cuts for a pivoting movement of the pivotable arm in a first rotational direction or second rotational direction, opposite the first rotational direction. The actuator may include a hydraulic cylinder. The hydraulic cylinder may include a first hydraulic cylinder. A second hydraulic cylinder may also be included. The second hydraulic cylinder may be coupled to the first end of the pivotable arm. The first hydraulic cylinder and the second hydraulic cylinder may cooperate to pivot the pivotable arm about the axis. The first hydraulic cylinder may extend and the second hydraulic cylinder may retract simultaneously to pivot the pivotable arm in a first rotational direction, and the first hydraulic cylinder may retract and the second hydraulic cylinder may extend simultaneously to pivot the pivotable arm in a second rotational direction, opposite the first rotational direction. A valve may reverse a movement of the hydraulic cylinder from a first direction to a second direction when the pivotable arm is pivoted by a first selected amount in the first direction, and the valve may reverse the movement of the cylinder from the second direction to the first direction when the pivotable arm is pivoted by a second selected amount in the second direction.

The various aspects may include one or more of the following features. The hydraulic cylinder may include a first hydraulic cylinder. A second hydraulic cylinder may be coupled to the first end of the pivotable arm. The first hydraulic cylinder and the second hydraulic cylinder may cooperate to pivot the pivotable arm about the axis. Pivoting a pivotable arm about an axis in a first direction of rotation in response to one of an extension or retraction of a hydraulic cylinder coupled to a first end of the pivotable arm may include one of extending the first hydraulic cylinder while simultaneously retracting the second hydraulic cylinder and retracting the first hydraulic cylinder while simultaneously extending the second hydraulic cylinder. A valve may be sequentially operated between a first position in which the first hydraulic cylinder is extended and the second hydraulic cylinder is retracted and a second position in which the first cylinder is retracted and the second cylinder is extended. Pivoting a pivotable arm about an axis in a first direction of rotation in response to one of an extension or retraction of a hydraulic cylinder coupled to a first end of the pivotable arm may include sequentially extending the hydraulic cylinder and retracting the hydraulic cylinder to reciprocate the pivotable arm about the axis. A tensioner may engage with the flexible component to generate tension in the flexible component. The follower may include a blade, and linearly displacing a follower coupled to opposing ends of the flexible component in response to the pulling force may include displacing the blade relative to a structure to perform a cutting action. Converting the alternating rotational movement of the pivotable arm about the axis into reciprocating linear movement may include translating a flexible component coupled to an end of the pivotable arm along a length of the flexible component and coupled to a follower at opposing ends of the flexible component. A first pulley may be engaged with the flexible component disposed on a first side of the follower, and a second pulley may be engaged with the flexible component disposed on a second side of the follower.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, systems, or methods and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

The present disclosure is directed to systems and methods of converting rotational movement into linear movement and, more particularly, converting reciprocating rotational movement into reciprocating linear movement for operation of components or systems of an agricultural machine. The generated linear reciprocating movement is applicable to operate one or more cutting blades. For example, the generated linear reciprocating movement is operable to reciprocate a cutterbar assembly provided on an agricultural harvesting head. The systems and methods are also applicable to operating components or systems of a combine harvester, such as drive systems for the cleaning shoes, shaker pan, or side knives of a combine harvester. However, the scope of the present disclosure is not limited to agricultural equipment but, rather, is applicable to any other application in which it is desirable to generated linear movement from rotary movement and, more particularly, reciprocating linear movement from reciprocating rotary movement.

Figure 1:
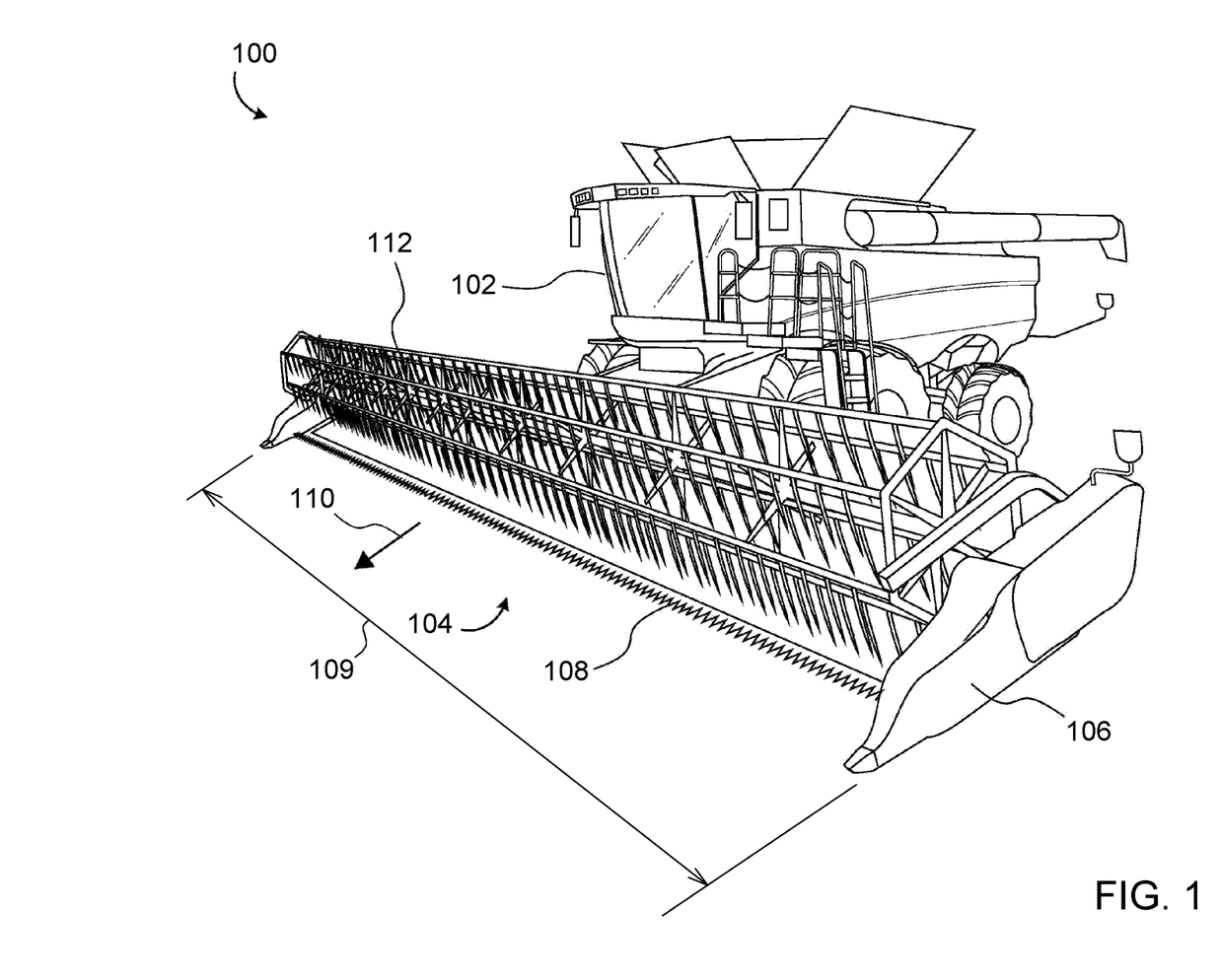
FIG. 1 is a perspective view of an agricultural harvester, according to some implementations of the present disclosure.

FIG. 1 is a perspective view of an example agricultural harvester 100. The agricultural harvester 100 includes a combine 102 and an agricultural harvesting head 104 supported on the front of the combine 102. The agricultural harvesting head 104 includes a frame 106 that extends laterally across the agricultural harvesting head 104 and a reciprocating cutterbar assembly 108. Although the agricultural harvester head 104 is shown as including a single cutterbar assembly 108, in other implementations, the harvester head 104 may include a plurality of cutterbar assemblies that are arranged along a width 109 of the agricultural harvesting head 104. For example, in some instances, the plurality of cutterbar assemblies may be arranged in series along the width 109 of the agricultural harvesting head 104. In some implementations, each of the cutterbar assemblies are actuated by a separate drive system.

As the agricultural harvester 100 travels in the direction indicated by the arrow 110, the reciprocating cutterbar assembly 108 is configured to sever crop plants near the roots of the crop plant, thereby releasing the crop plants from the soil. In some implementations, the agricultural harvesting head 104 also includes a reel assembly 112 that is pivotally coupled to the frame 106 and includes metal or plastic teeth that grip stalks of the crop plants and push the stalks towards the cutterbar assembly 108. Once severed, the crop plants are directed upward and rearward via a crop ramp. In some instances, the severed crop plants fall from the drop ramp onto a belt conveyor.

In some implementations, the agricultural harvesting head 104 includes a left side belt conveyor, a right-side belt conveyor, and a central belt conveyor. Severed crop plants deposited onto a left-side belt conveyor or a right-side belt conveyor are transported to the center of the harvesting head 200 and onto the central belt conveyor. In some instances, the central belt conveyor is configured to carry the crops rearward, underneath a feed drum, and into a feederhouse of the combine 102. The feederhouse is configured to transmit the harvested crop material into the combine 102 for further processing and storage.

Figure 2:
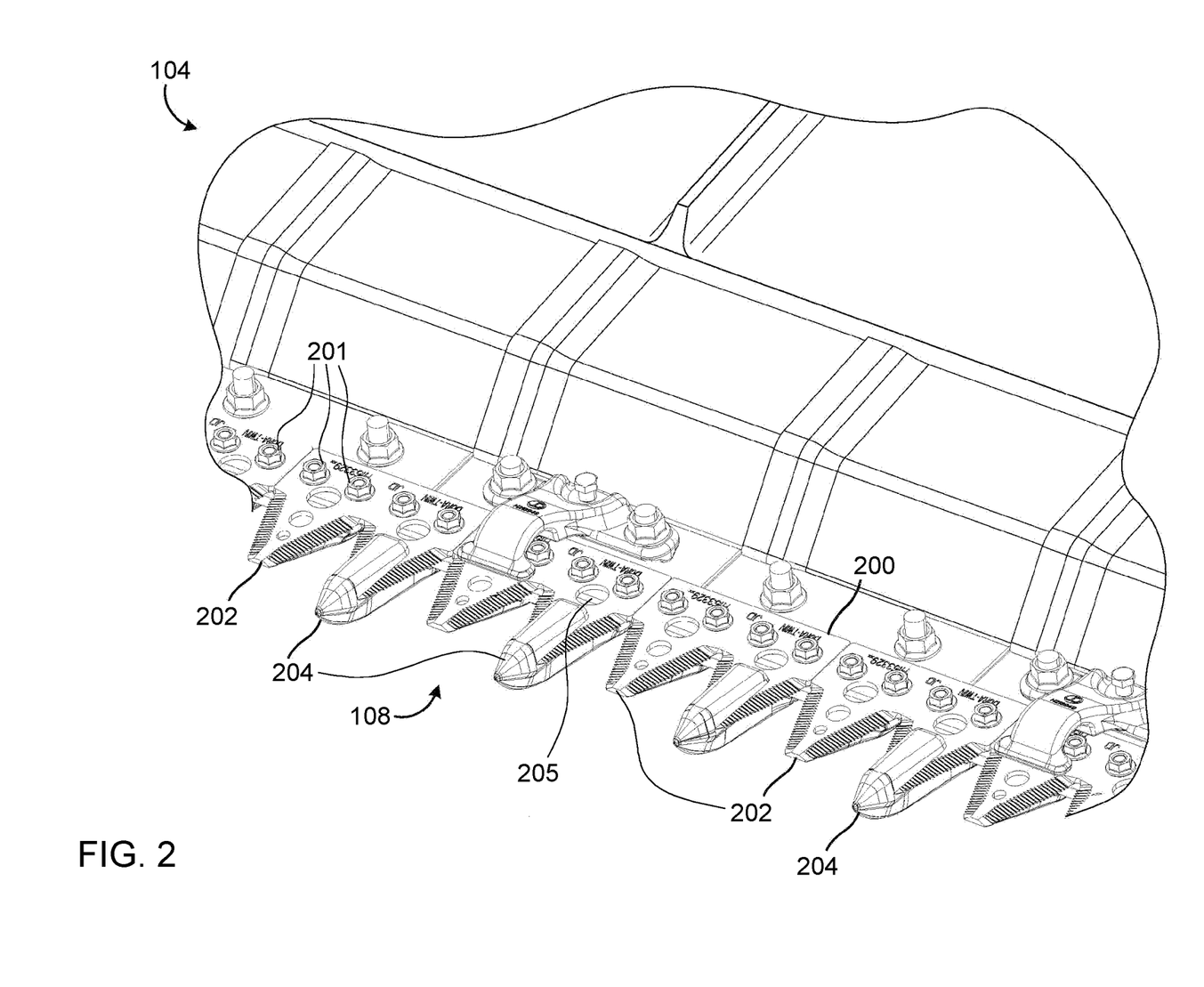
FIG. 2 is a detail view of a portion of the agricultural harvester of FIG. 1.

FIG. 2 is a detail view of a portion of the agricultural harvester head 104 of FIG. 1. Particularly, FIG. 1 shows a portion of the cutterbar assembly 108. The cutterbar assembly 108 includes a plurality of knife components 200 that are coupled together, such as with fasteners 201, to a backing component 205 (e.g., a bar). In this way, the knife components 200 move together. Each of the knife components 200 include one or more knives 202. The particular type of knife 202 can vary. For example, in some implementations, the knives 202 have a single blade knife configuration, while, in other implementations, the knives 202 have a double blade knife configuration, as illustrated in FIG. 2. The agricultural harvesting head 104 also includes a plurality of knife guards 204 that are positioned in opposition to the knives 202 to provide opposing surfaces for cutting the crop material with knives 202. In some implementations, one or both of the backing component 205 and the knife components 200 of the cutterbar assembly 200 are formed from a flexible material (e.g., metal) that permits flexure of the cutterbar assembly 200 across a length of the agricultural harvesting head 104.

The agricultural harvesting head 104 also includes a drive system, discussed in more detail below. The drive system reciprocates the cutterbar assembly 108 relative to the knife guards 204 to sever crop plants during a harvesting operation.

Figure 3:
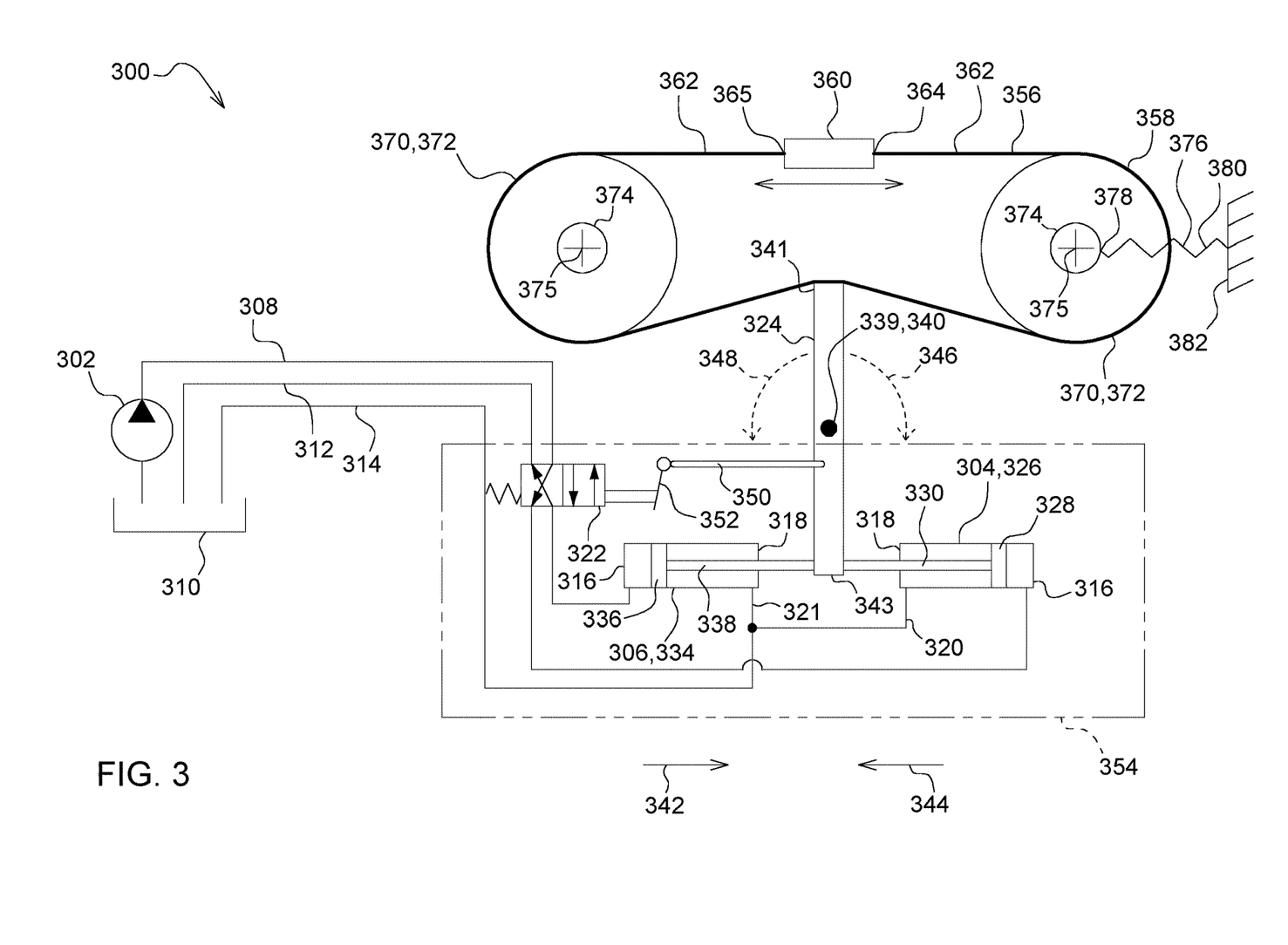
FIG. 3 is a schematic of an example drive system for generating reciprocating linear motion from reciprocating rotary motion, according to some implementations of the present disclosure.

FIG. 3 is a schematic of an example drive system 300 for generating reciprocating linear movement from reciprocating rotary movement. In the illustrated example, the system 300 is a hydro-mechanically operated system, and, more particularly, the example drive system 300 is a knife drive system that operates to reciprocate a cutterbar assembly of an agricultural harvesting head in a linear reciprocating motion using a reciprocating rotary motion. In some implementations, power is provided the drive system 300 via a power take-off shaft provided on a vehicle, such as an agricultural vehicle. For example, in some instances, the power provided by a power take-off shaft is used to power a hydraulic pump of the drive system 300. However, the scope of the disclosure is not so limited. Thus, the power provided to the drive system 300 may be provided by other power sources. In the illustrated example, the drive system 300 is located on an agricultural harvesting head, which may be similar to the agricultural harvesting head 104.

The drive system 300 includes a hydraulic pump 302 in fluid communication with a first hydraulic cylinder 304 and a second hydraulic cylinder 306. The hydraulic pump 302 pumps hydraulic fluid to the first and second hydraulic cylinders 304 and 306 via a feed line 308. Hydraulic fluid from the first and second hydraulic cylinders 304 and 306 are returned to a sump 310 via a return lines 312 and 314. The hydraulic pump 302 is in fluid communication with the sump 310 and draws hydraulic fluid from the sump 310 for recirculation to the hydraulic cylinders 304 and 306. Although hydraulic cylinders 304 and 306 are described, other types of actuators are usable. For example, in some implementations, pneumatic, mechanical, or electric actuators are used. Further, in some instances, actuators other than linear actuators can be used. For example, in some instances rotary actuators are used.

Each of the hydraulic cylinders 304 and 306 include a first or piston end 316 and a second or rod end 318. The second ends 318 of the first and second hydraulic cylinders 304 and 306 are in fluid communication via connecting lines 320 and 321. The connecting lines 320 and 321 connect to and are in fluid communication with the return line 314. The hydraulic fluid is returned to the sump 310 from the first ends 316 via the return line 312. The hydraulic fluid is returned to the sump 310 from the second ends 318 via the return line 314. The various lines of the drive system 300 used to carry hydraulic fluid may be in the form of pipes or other types of conduits operable to conduct hydraulic fluid.

The drive system 300 also includes a two-position solenoid operated valve 322 and a pivotable arm 324. In other implementations, the valve 322 may have other forms. For example, in some instances, the valve 322 is a hydraulic sequencing valve. Further, in some implementations, the drive system 300 includes an electro-hydraulic switching. As a result, the valve 322 may be omitted and replaced by the electro-hydraulic switching. The first hydraulic cylinder 304 includes a housing 326 and a piston 328 and a rod 330 disposed in the housing 326. The rod 330 is coupled to the piston 328 and extends from the housing 326. The rod 330 couples to a pivotable arm 324, discussed in more detail later. Similarly, the second hydraulic cylinder 306 includes a housing 334 and a piston 336 and a rod 338 disposed in the housing 334. The rod 338 is coupled to the piston 336, extends from the housing 334, and is coupled to the pivotable arm 324. In some implementations, the rods 330 and 338 are coupled to an end of the pivotable arm 324 opposite the end 341. However, in other implementations, the rods 330 and 338 are coupled to a location of the pivotable arm 324 other than an end. For example, in some instances, the pivotable arm 324 extends beyond a location where one or both rods 330 and 338 coupled to the pivotable arm 324. Displacement of the pistons 328 and 336 within the respective housings 326 and 334 causes displacement of the rods 330 and 338, respectively. Displacement of the rods 330 and 338 causes the pivotable arm 324 to rotate about an axis 339 defined by a pivot 340. In some implementations, the axis 339 and pivot 340 are located along the pivotable arm 324 between opposing ends 341 and 343 of the pivotable arm 324.

The valve 322 is movable between a first position and a second position. With the valve 322 in the first position, hydraulic fluid from the pump 310 is directed to a first end 316 of the first hydraulic cylinder 304, displacing a first piston 328 and the rod 330 of the first hydraulic cylinder 304 in the direction of arrow 344. Hydraulic fluid within the housing 326 of the first hydraulic cylinder 304 is expelled from the housing at the second end 318 via the connecting line 320 by displacement of the piston 328 in the direction of arrow 344. As a result, the first hydraulic cylinder 304 extends to pivot the direction of arrow 346. Because both of the rods 330 and 338 are coupled to the pivotable arm 324, extension of the first hydraulic cylinder 304 results in retraction of the second hydraulic cylinder 306. Retraction of the second hydraulic cylinder 306 causes the piston 326 and rod 330 to move in the direction of arrow 344, resulting in hydraulic fluid being expelled from the first end 316 and returned to the sump 310 via the return line 312. Simultaneously, hydraulic fluid is drawn into the housing 334 of the second hydraulic cylinder 306 via the connecting line 321.

In the second position, the valve 322 directs hydraulic fluid from the pump 302 to the first end 316 of the second hydraulic cylinder 306, causing a second piston 336 and the rod 338 of the second hydraulic cylinder 306 to be displaced in the direction of arrow 342. In response, the rod 330 and piston 328 of the first hydraulic cylinder 304 is also displaced in the direction of arrow 342. As a result, the second hydraulic cylinder 306 extends, the second hydraulic cylinder retracts, and the pivotable arm 324 is rotated about the axis 339 of the pivot 340 in the direction of arrow 348, opposite the direction of arrow 346.

Displacement of the piston 336 of the second hydraulic cylinder in the direction of arrow 342 expels hydraulic fluid from the second end 318 of the second hydraulic cylinder 306 via the connecting line 321. Displacement of the piston 328 of the first hydraulic cylinder 304 causes hydraulic fluid to be expelled from the first end 316 thereof and hydraulic fluid to be drawn into the housing 326 via the connecting line 320.

In the illustrated example, actuation of the valve 322 is accomplished by a protrusion 350 that is coupled to the pivotable arm 324. With the valve 322 in the first position, the first hydraulic cylinder 304 extends and the second hydraulic cylinder 306 retracts, resulting in the pivotable arm 324 being rotated in the direction of arrow 346. When the pivotable arm 324 rotates in the direction of arrow 346 reaches a selected amount, the protrusion 350 triggers the valve 322 (such as by a switch 352, e.g., a rocker switch, or other type of actuator) to cause the valve 322 to move to the second position, causing rotation of the pivotable arm 324 to reverse. Similarly, rotation of the pivotable arm 324 in the direction of arrow 348 continues until a selected amount of rotation is achieved, at which time the protrusion 350 triggers the valve 322 to move to position 1, and the rotation of the pivotable arm 324 is reversed once again. Thus, in operation, the valve 322 is reciprocated between the first and second positions, causing the pivotable arm 324 to reciprocate about the axis 339 of the pivot 340 in the directions of arrows 346 and 348 in response to actuation of the first and second hydraulic cylinders 304 and 306.

In some implementations, the first and second hydraulic cylinders 304 and 306, the pivot 340, the valve 322, and the protrusion 350 form parts of a hydraulic motor assembly 354. Further, the combination of these components, whether integrated as a hydraulic motor assembly or otherwise, provides for reciprocating movement to linearly reciprocate an object, such as a cutterbar assembly of an agricultural harvesting head.

Figure 4:
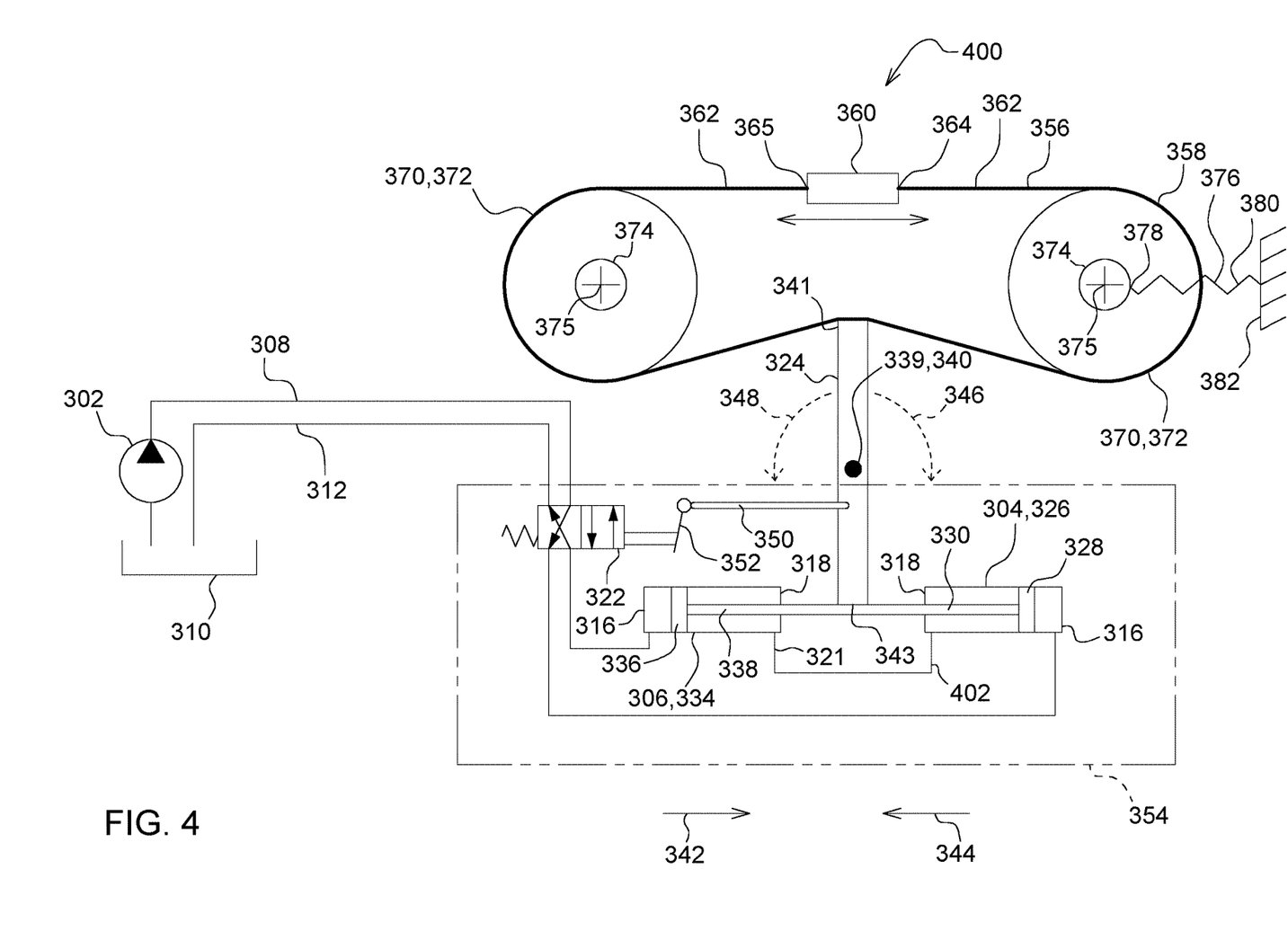
FIG. 4 is a schematic of an example drive system for generating reciprocating linear motion from reciprocating rotary motion, according to some implementations of the present disclosure.

FIG. 4 illustrates another example drive system 400 that is similar to drive system 300. The drive system 400 is identical to the drive system 300 except that a return line from the second ends 318 of the first and second hydraulic cylinders 304 and 306 is eliminated, and a connecting line 402 connects the second ends 318 of first and second hydraulic cylinders 304 and 306 and provides fluid communication between the interiors of the housings 326 and 334 of the first and second hydraulic cylinders 304 and 306, respectively. In operation, when the first hydraulic cylinder 304 extends, hydraulic fluid is forced out of the housing 326 of the first hydraulic cylinder 304 by the piston 328. The expelled hydraulic fluid is conducted to the second end 318 of the second hydraulic cylinder 306 and introduced into the interior of the housing 334 of the second hydraulic cylinder 306 as the second hydraulic cylinder 306 is retracted. Thus, the hydraulic fluid disposed between the pistons 328 and 336 and within the connecting line 402 forms a closed system. The hydraulic fluid contained therein is flowed between the interiors of the housings 326 and 334 in response to the reciprocating movements of the pistons 328 and 336.

Returning to FIG. 3, the drive system 300 also includes a cutter assembly 356 and a tensioner 358. The cutter assembly 356 includes a follower 360 and a flexible component 362 that couple to ends 364 of the follower 360. In some implementations, the follower 360 includes a cutter, blade, or other device operable to sever crop plants. For example, in some instance, the follower 360 is a cutterbar assembly that is similar to the cutterbar assembly 108 described earlier. Example flexible components 362 include cables, chains, or any other material or structure that is flexible to operate the follower 360 during a harvesting operation. For example, in some instances, the flexible component includes flexible elongated components adapted to conform to a curved surface. In the illustrated example, the flexible component 362 is coupled to the end 341 of the pivotable arm 324. Thus, the flexible component 362 is movable in response to rotation of the pivotable arm 324 about the axis 339 of the pivot 340. In other implementations, the flexible component 362 couples to the pivotable arm 324 at a location other than the end 341. In some implementations, the end 341 of the pivotable arm 324 is coupled at a midpoint of the flexible component 362. In other implementations, two flexible components 362 are used, with one flexible component 362 extending from the pivotable arm 324 (e.g., the end 341) to a first end of the 364 of the follower 360 and the other flexible component 362 extending from the pivotable arm 324 (e.g., end 341) to a second end of the 365 of the follower 360, opposite the other end 364.

The tensioner 358 includes curved surfaces 370. In this example, the curved surfaces 370 are circular and are defined by perimeters of pulleys 372. Although the curved surfaces 370 have a circular shape, in other implementations, the curved surfaces 370 may have other shapes. Further, in some implementations, the pulleys 372 may not form complete circular shapes. For example, in some implementations, the pulleys 372 may form a portion of a circle less than a complete circle.

In the illustrated example, the pulleys 372 are pivotable on respective shafts 374 about axes 375 defined by the shafts 374. In other implementations, the pulleys 372 may be fixed and the flexible component 362 move relative to the curved surfaces 370 during operation of the system. Further, the tensioner 358 includes a biasing component 376. At a first end 378, the biasing component 376 is coupled to the shaft 374 of the pulley 372 located on the right-hand side of FIG. 3. In some implementations, the biasing component 376 is a spring, such as a coil spring, for example. A second end 380 of the biasing component 376 is coupled another component 382 of the agricultural harvesting head, such as a portion of a frame of an agricultural harvesting head. The biasing component 376 operates to separate the shafts 374 so as to apply tension in the flexible component 362. Although the present example includes a single biasing component 376, in other implementations, other biasing components may be included. For example, in some implementations, a biasing component may also be coupled to the shaft 374 of the pulley 372 located on the left-hand side of FIG. 3. Thus, in some implementations, each of the shafts 376 may be coupled to a biasing component 376 that operates to separate the shafts 374 to introduce tension into the flexible component 362. Although the example biasing component 376 is shown as being is tension, in other implementations, a biasing component in compression may be used to tension the flexible component 362.

In operation, the end 341 of the pivotable arm 324 moves in an arcuate motion as the pivotable arm 324 is reciprocated in the directions of arrows 346 and 348. As a result of the curved surfaces 370, to which the flexible component 362 conforms, the resulting motion of the follower 360 is a linear motion. That is, in response to the reciprocating pivotable motion of the pivotable arm 324, the follower 360 is linearly reciprocated in the direction of arrows 342 and 344 as a result of engagement between the flexible component 362 and the pulleys 372. In some implementations in which the follower is a cutterbar assembly, an amount of linear displacement in response to rotation of the pivotable arm 324 corresponds to a length of two knives, which may be similar to knives 202 described earlier. Movement by this amount results in two cuts as two knives are moved past a knife guard (which may be similar to knife guard 204) during one linear movement. In other implementations, the amount of linear displacement in response to rotation of the pivotable arm 324 may be greater than or less than a length of two knives resulting in a different number of cuts.

By linearly reciprocating the follower 360 in this way, a size, weight, and complexity of the drive system 300 is reduced compared to reciprocating apparatuses presently available. These benefits are similarly applicable to drive system 400. Further, as a result of the simplicity of the drive systems 300 and 400, the reliability thereof is also improved. The drive systems 300 and 400 and other systems within the scope of the present disclosure provide for increased power densities, resulting in large forces produced by as system that has a reduced size and weight comparable to present drive systems. The systems within the scope of the present disclosure also provide for improved efficiency due, at least in part, to the reduced complexity of the systems. For example, the system of the present disclosure eliminate a gearbox that is generally included with present systems used to oscillate a cutter in a linear fashion. Elimination of this gearbox reduces cost, weight, and complexity, resulting in cost saving, weight saving, and increased reliability.

Figure 5:
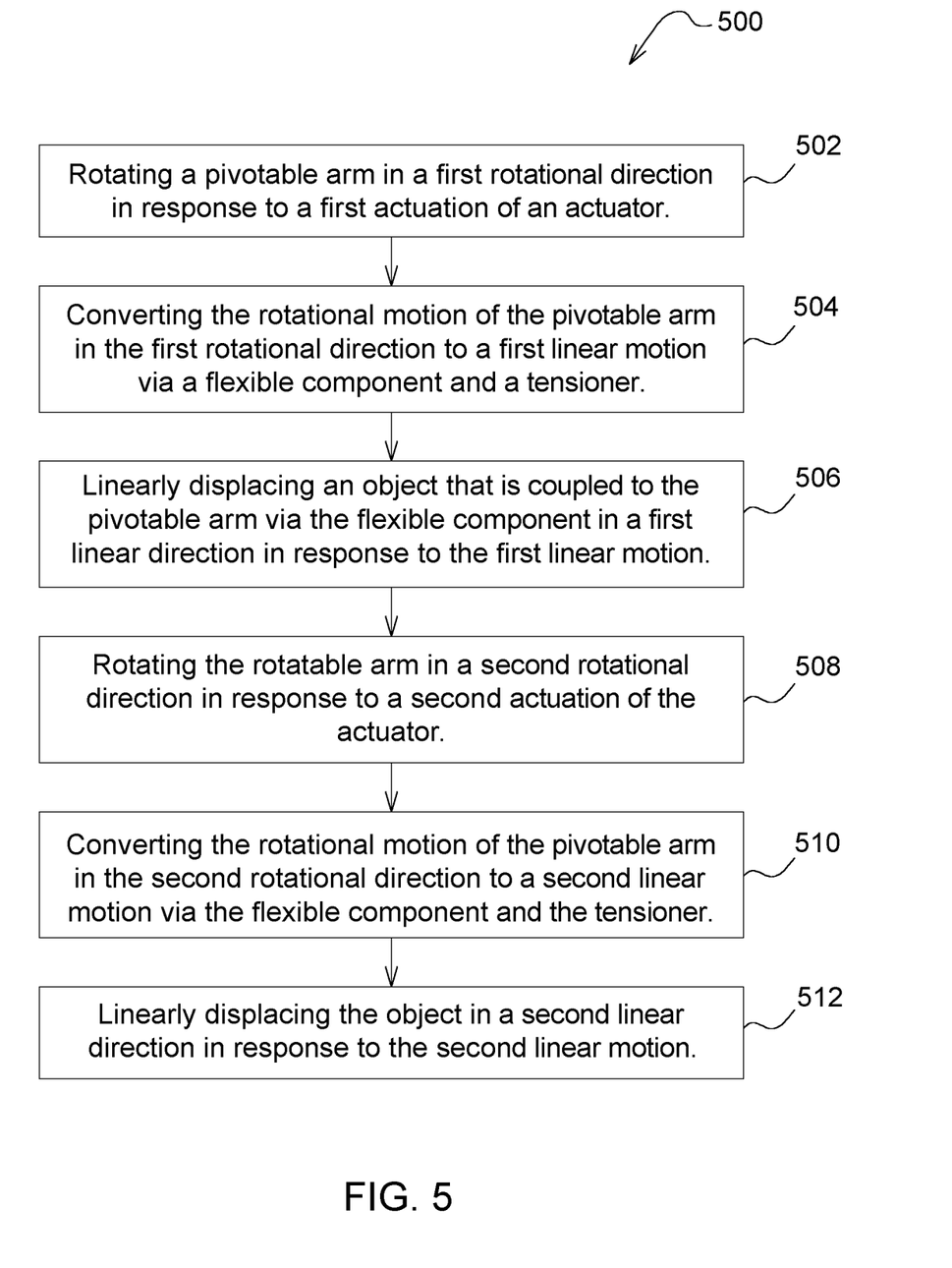
FIG. 5 is a flowchart of an example method of reciprocating an object, according to some implementations of the present disclosure.

FIG. 5 is a flowchart of an example method 500 of reciprocating an item, such as a cutter or knife in the context of an agricultural harvesting head. At 502, a pivotable arm is rotated in a first rotational direction in response to a first actuation of an actuator. In some implementations, the actuator is a linear actuator, such an electric or hydraulic cylinder. At 504, the rotational motion of the pivotable arm in the first rotational direction is converted to a first linear motion via a flexible component and a tensioner. At 506, an object that is coupled to the pivotable arm via the flexible component is linearly displaced in a first linear direction in response to the first linear motion converted from rotation in the first rotational direction of the actuation of the actuator. In some implementations, the object is a cutting instrument, such as a knife or a plurality of knives. For example, in some instances, the object being linearly displaced is a cutterbar assembly as described earlier. At 508, the rotatable arm is rotated in a second rotational direction in response to a second actuation of the actuator. At 510, the rotational motion of the pivotable arm in the second rotational direction is converted to a second linear motion via the flexible component and the tensioner. At 512, the object is linearly displaced in a second linear direction in response to the second linear motion in converted from rotation in the second rotational direction of the actuation of the actuator. These different actions may be repeated for a selected number of cycles or indefinitely to produce linear reciprocation of the object.

Without in any way limiting the scope, interpretation, or application of the claims appearing below, a technical effect of one or more of the example implementations disclosed herein is to provide a drive system that generates linear movement having reduced weight, complexity, and cost with improved reliability.

While the above describes example implementations of the present disclosure, these descriptions should not be viewed in a limiting sense. Rather, other variations and modifications may be made without departing from the scope and spirit of the present disclosure as defined in the appended claims.

What is claimed is:

1. A drive system comprising:
    a pivotable arm pivotable about an axis disposed between a first end of the pivotable arm and a second end of the pivotable arm opposite the first end;
    an actuator coupled to a first end of the pivotable arm, the pivotable arm pivotable about the axis in response to one of an extension or retraction of the actuator;
    a flexible component coupled to the second end of the pivotable arm;
    a follower coupled to opposing ends of the flexible component, the follower movable in a linear motion in response to the extension or the retraction of the actuator;
    a tensioner that engages with the flexible component to generate tension in the flexible component; and
    a valve that reverses a movement of the actuator from a first direction to a second direction when the pivotable arm is pivoted by a first selected amount in the first direction and reverse the movement of the actuator from the second direction to the first direction when the pivotable arm is pivoted by a second selected amount in the second direction,
    wherein the valve is a two-position solenoid operated valve.

2. The drive system of claim 1, wherein the follower comprises a blade.

3. The drive system of claim 2, wherein the blade performs two cuts for a pivoting movement of the pivotable arm in a first rotational direction or second rotational direction, opposite the first rotational direction.

4. The drive system of claim 1, wherein the actuator comprises a hydraulic cylinder.

5. The drive system of claim 4, wherein the hydraulic cylinder comprises a first hydraulic cylinder and further comprising a second hydraulic cylinder, the second hydraulic cylinder coupled to the first end of the pivotable arm, wherein the first hydraulic cylinder and the second hydraulic cylinder cooperate to pivot the pivotable arm about the axis.

6. The drive system of claim 5, wherein the first hydraulic cylinder extends and the second hydraulic cylinder retracts simultaneously to pivot the pivotable arm in a first rotational direction and the first hydraulic cylinder retracts and the second hydraulic cylinder extends simultaneously to pivot the pivotable arm in a second rotational direction, opposite the first rotational direction.

7. The drive system of claim 1, further comprising a first pulley engaged with the flexible component and a second pulley engaged with the flexible component, the first pulley disposed on a first side of the follower and the second pulley disposed on a second side of the follower opposite the first side.

8. A method of generating linear motion from pivoting motion, the method comprising:
    pivoting a pivotable arm about an axis in a first direction of rotation in response to one of an extension or retraction of a hydraulic cylinder coupled to a first end of the pivotable arm;
    displacing a flexible component coupled to a second end of the pivotable arm to generate a pulling force at an end of the flexible component, opposite the first end, in response to pivoting of the pivotable arm by the hydraulic cylinder;
    linearly displacing a follower coupled to opposing ends of the flexible component in response to the pulling force; and
    applying, with a tensioner engaged with the flexible component, tension in the flexible component; and
    reversing, with a two-position solenoid operated valve, the linear displacement of the follower from a first direction to a second direction.

9. The method of claim 8, wherein the hydraulic cylinder comprises a first hydraulic cylinder and further comprising a second hydraulic cylinder coupled to the first end of the pivotable arm, wherein the first hydraulic cylinder and the second hydraulic cylinder cooperate to pivot the pivotable arm about the axis.

10. The method of claim 9, wherein pivoting the pivotable arm about the axis in the first direction of rotation in response to one of the extension or retraction of the hydraulic cylinder coupled to the first end of the pivotable arm comprises one of extending the first hydraulic cylinder while simultaneously retracting the second hydraulic cylinder and retracting the first hydraulic cylinder while simultaneously extending the second hydraulic cylinder.

11. The method of claim 10, further comprising sequentially operating a valve between a first position in which the first hydraulic cylinder is extended and the second hydraulic cylinder is retracted and a second position in which the first cylinder is retracted and the second cylinder is extended.

12. The method of claim 8, further comprising pivoting the pivotable arm about the axis in a second direction of rotation in response to the other of the extension or retraction of a hydraulic cylinder coupled to the first end of the pivotable arm.

13. The method of claim 9, wherein the follower comprises a blade, and wherein linearly displacing the follower coupled to the opposing ends of the flexible component in response to the pulling force comprises displacing the blade relative to a structure to perform a cutting action.

14. A method comprising:
    alternately rotating, in response to operation of a two-position solenoid operated valve, a pivotable arm about an axis in a first rotational direction and a second rotational direction by alternately extending an actuator and retracting the actuator;
    converting the alternating rotational movement of the pivotable arm about the axis into a reciprocating linear movement; and reciprocating a follower in linear motion in response to the converted reciprocating rotational movement, wherein converting the alternating rotational movement of the pivotable arm about the axis into reciprocating linear movement comprises translating a flexible component coupled to an end of the pivotable arm along a length of the flexible component and coupled to the follower at opposing ends of the flexible component, and further comprising engaging the flexible component with a tensioner to generate tension in the flexible component.

15. The method of claim 14, wherein the tensioner comprises a first pulley engaged with the flexible component disposed on a first side of the follower and a second pulley engaged with the flexible component disposed on a second side of the follower.

\* \* \* \* \*

UNITED STATES PATENT AND TRADEMARK OFFICE
CERTIFICATE OF CORRECTION

PATENT NO. : 11,903,338 B2  
APPLICATION NO. : 17/446752  
DATED : February 20, 2024  
INVENTOR(S) : Todd M. Verhoef, Curt Elpers and Logan Trueblood Page 1 of 1

It is certified that error appears in the above-identified patent and that said Letters Patent is hereby corrected as shown below:

On the Title Page

Item (73), the Assignee identifies as: "Moline, IL, Moline, IL (US)".  
Please change to: "Deere & Co., Moline, IL (US)".

Signed and Sealed this  
Thirteenth Day of January, 2026

John A. Squires  
*Director of the United States Patent and Trademark Office*